(12) United States Patent
Suissa et al.

(10) Patent No.: US 11,679,804 B2
(45) Date of Patent: Jun. 20, 2023

(54) LIMITING SYSTEM FOR CONSTRAINING THE COMMANDED STEERING ANGLE OF A STEERING SYSTEM

(71) Applicant: GM Global Technology Operations LLC, Detroit, MI (US)

(72) Inventors: Avshalom Suissa, Ganei Tikva (IL); Audrey Devin Porter, Hazel Park, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 193 days.

(21) Appl. No.: 17/335,538

(22) Filed: Jun. 1, 2021

(65) Prior Publication Data
US 2022/0379955 A1 Dec. 1, 2022

(51) Int. Cl.
*B62D 6/00* (2006.01)
(52) U.S. Cl.
CPC .................................. *B62D 6/002* (2013.01)
(58) Field of Classification Search
None
See application file for complete search history.

(56) References Cited

U.S. PATENT DOCUMENTS

| | | | | |
|---|---|---|---|---|
| 7,164,980 B1* | 1/2007 | Doll | ....................... | B60T 8/1755 303/146 |
| 10,351,168 B2* | 7/2019 | Tsubaki | ............... | B62D 15/025 |
| 2018/0350242 A1* | 12/2018 | Fujii | ............... | B60W 30/18163 |
| 2019/0092331 A1* | 3/2019 | Ide | ......................... | B60W 10/20 |
| 2019/0300044 A1* | 10/2019 | Tsubaki | .................... | B62D 5/04 |
| 2020/0010112 A1* | 1/2020 | Toko | ..................... | B62D 5/0409 |
| 2020/0174482 A1* | 6/2020 | Cheon | .................. | G05D 1/0214 |
| 2020/0189591 A1* | 6/2020 | Mellinger, III | ........ | B62D 6/003 |
| 2021/0053616 A1* | 2/2021 | Funke | .................... | B62D 5/046 |
| 2021/0061356 A1* | 3/2021 | Kasai | ................. | G01C 21/3407 |
| 2021/0109539 A1* | 4/2021 | Kobilarov | .......... | B60W 60/0011 |
| 2021/0245806 A1* | 8/2021 | Suzuki | ................ | B60W 30/182 |
| 2021/0271255 A1* | 9/2021 | Dix | ..................... | B60W 30/045 |
| 2022/0194416 A1* | 6/2022 | Oniwa | .............. | B60W 50/0205 |
| 2022/0340165 A1* | 10/2022 | Johnson | .......... | B60W 30/18163 |

* cited by examiner

*Primary Examiner* — Ryan Rink
(74) *Attorney, Agent, or Firm* — Vivacqua Crane PLLC

(57) ABSTRACT

A limiting system for constraining a commanded steering angle for a vehicle including an electric power steering (EPS) system includes a controller in electronic communication with at least one other system of the vehicle. The controller executes instructions to receive a plurality of trajectory planning inputs that are each expressed as an array including a plurality of values, where the plurality of trajectory planning inputs includes a trajectory velocity array, a trajectory acceleration array, and a trajectory curvature array. The controller also executes instructions to determine a maximum rate of steering angle change based on the corresponding ideal rate of change of the commanded steering angle and the maximum rate change allowed by the EPS system.

20 Claims, 4 Drawing Sheets

LIMITING SYSTEM FOR CONSTRAINING THE COMMANDED STEERING ANGLE OF A STEERING SYSTEM

INTRODUCTION

The present disclosure relates to systems and methods for constraining a commanded steering angle sent to a steering system that is part of a vehicle. More particularly, the present disclosure relates to systems and methods for limiting a rate of change of the commanded steering angle sent to the steering system based on a current trajectory of the vehicle.

Semi-autonomous and autonomous vehicles are becoming more ubiquitous on the road. During semi-autonomous or hands-free driving, model predictive control may be employed to determine the vehicle's acceleration, braking, and steering. A model predictive controller attempts to track a target trajectory of the vehicle by controlling a commanded steering angle that is provided to the vehicle's steering system. The model predictive controller determines the commanded steering angle based on time-based trajectory information, localization inputs, and planner inputs. However, it is to be appreciated that sometimes the localization inputs may be noisy and generate discontinuous signals. Noisy and discontinuous localization input signals may adversely affect the calculation of the commanded steering angle. In particular, if there are sudden jumps in the value of the commanded steering angle this may create noisiness or jerking in the steering wheel that some drivers may find objectionable.

Thus, while current systems achieve their intended purpose, there is a need in the art for an improved system for determining the commanded steering angle. In particular, there is a need in the art for a system that mitigates the impact of noisy or discontinuous localization inputs when determining the commanded steering angle.

SUMMARY

According to several aspects a limiting system constraining a commanded steering angle for a vehicle including an electric power steering (EPS) system is disclosed. The limiting system includes a controller in electronic communication with at least one other system of the vehicle. The controller executes instructions to receive a plurality of trajectory planning inputs that are each expressed as an array including a plurality of values, where the plurality of trajectory planning inputs includes a trajectory velocity array, a trajectory acceleration array, and a trajectory curvature array. The controller also executes instructions to determine a corresponding ideal rate of change of the commanded steering angle for each curvature value that is part of the trajectory curvature array based on the trajectory planning inputs. The controller also executes instructions to determine a maximum rate of change allowed by the EPS system for each trajectory velocity value that is part of the trajectory velocity array. Finally, the controller executes instructions to determine a maximum rate of steering angle change based on the corresponding ideal rate of change of the commanded steering angle and the maximum rate change allowed by the EPS system, where the maximum rate of steering angle change limits the commanded steering angle.

In an aspect, the controller determines the corresponding ideal rate of change of the commanded steering angle for each curvature value that is part of the trajectory curvature array by executing instructions to determine a rate of change of a trajectory curvature based on a current value of the trajectory curvature, a subsequent value of the trajectory curvature, and a change in time between a current value of the trajectory curvature and the subsequent value of the trajectory curvature.

In another aspect, the rate of change of the trajectory curvature is determined by $$\dot{\rho} = \frac{\rho_{n+1} - \rho_n}{\Delta t}$$

where $\dot{\rho}$ represents the rate of change of the trajectory curvature, $\rho_n$ represents a current value of the trajectory curvature, $\rho_{n+1}$ represents the subsequent value of the trajectory curvature, and $\Delta t$ represents the change in time between the current value of the trajectory curvature $\rho_n$ and the subsequent value of the trajectory curvature.

In yet another aspect, the controller determines the corresponding ideal rate of change of the commanded steering angle for each curvature value that is part of the trajectory curvature array by executing instructions to determine the corresponding ideal rate of change of the commanded steering angle based on the rate of change of the trajectory curvature, a wheelbase of the vehicle, a steering gradient of the vehicle, and a longitudinal velocity component of the vehicle.

In still another aspect, the corresponding ideal rate of change of the commanded steering angle is determined by:

$$\dot{\delta}_{ideal} = \dot{\rho}(L + EG v_x^2)$$

where $\dot{\delta}_{ideal}$ is corresponding ideal rate of change of the commanded steering angle, $\dot{\rho}$ is the rate of change of the trajectory curvature, L is a wheelbase of the vehicle, EG is a steering gradient of the vehicle, and $v_x$ is a longitudinal velocity component of a trajectory of the vehicle.

In one aspect, the controller includes one or more look-up tables saved in memory, and the one or more look-up tables provide the maximum rate of change allowed for a specific trajectory velocity value.

In another aspect, the controller determines the maximum rate of change allowed by the EPS system by executing instructions to locate a corresponding maximum rate of change value in the one or more look-up tables based on a specific trajectory velocity value.

In yet another aspect, the controller determines the maximum rate of steering angle change based on a calibration factor.

In still another aspect, the calibration factor ranges in value from 0 to 1.

In one aspect, the controller determines the maximum rate of change of the commanded steering angle by executing instructions to add the corresponding ideal rate of change of the commanded steering angle with a product to determine a first value, wherein the product is determined by multiplying the maximum rate of change with the calibration factor.

In another aspect, the controller determines the maximum rate of change of the commanded steering angle by executing instructions to compare the first value with the maximum rate of change, and in response to determining the first value is less than or equal to the maximum rate of change, set the maximum rate of change of the commanded steering angle to the first value.

In yet another aspect, the controller determines the maximum rate of change of the commanded steering angle by executing instructions to compare the first value with the maximum rate of change and in response to determining the first value is greater than the maximum rate of change, set the maximum rate of change of the commanded steering angle to the maximum rate of change allowed by the EPS system.

In one aspect, an autonomous driving and active safety (ADAS) system for a vehicle including an EPS system. The ADAS system includes a trajectory tracking controller that determines a commanded steering angle, where the trajectory tracking controller is in electronic communication with the EPS system and a limiting system including a controller in electronic communication with the trajectory tracking controller. The controller executes instructions to receive a plurality of trajectory planning inputs that are each expressed as an array including a plurality of values, where the plurality of trajectory planning inputs includes a trajectory velocity array, a trajectory acceleration array, and a trajectory curvature array. The controller also executes instructions to determine a corresponding ideal rate of change of the commanded steering angle for each curvature value that is part of the trajectory curvature array based on the trajectory planning inputs. The controller executes instructions to determine a maximum rate of change allowed by the EPS system for each trajectory velocity value that is part of the trajectory velocity array. Finally, the controller executes instructions to determine a maximum rate of steering angle change based on the corresponding ideal rate of change of the commanded steering angle and the maximum rate change allowed by the EPS system, where the maximum rate of steering angle change limits the commanded steering angle.

In one aspect, the trajectory tracking controller determines the commanded steering angle based on the maximum rate of steering angle change.

In another aspect, the controller determines the corresponding ideal rate of change of the commanded steering angle for each curvature value that is part of the trajectory curvature array by executing instructions to determine a rate of change of a trajectory curvature based on a current value of the trajectory curvature, a subsequent value of the trajectory curvature, and a change in time between a current value of the trajectory curvature and the subsequent value of the trajectory curvature.

In yet another aspect, the rate of change of the trajectory curvature is determined by $$\dot{\rho} = \frac{\rho_{n+1} - \rho_n}{\Delta t}$$

where $\dot{\rho}$ represents the rate of change of the trajectory curvature, $\rho_n$ represents a current value of the trajectory curvature, $\rho_{n+1}$ represents the subsequent value of the trajectory curvature, and $\Delta t$ represents the change in time between the current value of the trajectory curvature $\rho_n$ and the subsequent value of the trajectory curvature.

In still another aspect, the controller determines the corresponding ideal rate of change of the commanded steering angle for each curvature value that is part of the trajectory curvature array by executing instructions to determine the corresponding ideal rate of change of the commanded steering angle based on the rate of change of the trajectory curvature, a wheelbase of the vehicle, a steering gradient of the vehicle, and a longitudinal velocity component of the vehicle.

In one aspect, the corresponding ideal rate of change of the commanded steering angle is determined by:

$$\dot{\delta}_{ideal} = \dot{\rho}(L + EGv_x^2)$$

where $\dot{\delta}_{ideal}$ is corresponding ideal rate of change of the commanded steering angle, $\dot{\rho}$ is the rate of change of the trajectory curvature, L is a wheelbase of the vehicle, EG is a steering gradient of the vehicle, and $v_x$ is a longitudinal velocity component of a trajectory of the vehicle.

In another aspect, the controller determines the maximum rate of steering angle change based on a calibration factor.

In one aspect, a method for constraining a commanded steering angle for a vehicle including an electric power steering (EPS) system is disclosed. The method includes receiving, by a controller, a plurality of trajectory planning inputs that are each expressed as an array including a plurality of values. The plurality of trajectory planning inputs includes a trajectory velocity array, a trajectory acceleration array, and a trajectory curvature array. The method also includes determining a corresponding ideal rate of change of the commanded steering angle for each curvature value that is part of the trajectory curvature array based on the trajectory planning inputs. The method further includes determining a maximum rate of change allowed by the EPS system for each trajectory velocity value that is part of the trajectory velocity array. Finally, the method includes determining a maximum rate of steering angle change based on the corresponding ideal rate of change of the commanded steering angle and the maximum rate change allowed by the EPS system, where the maximum rate of steering angle change limits the commanded steering angle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
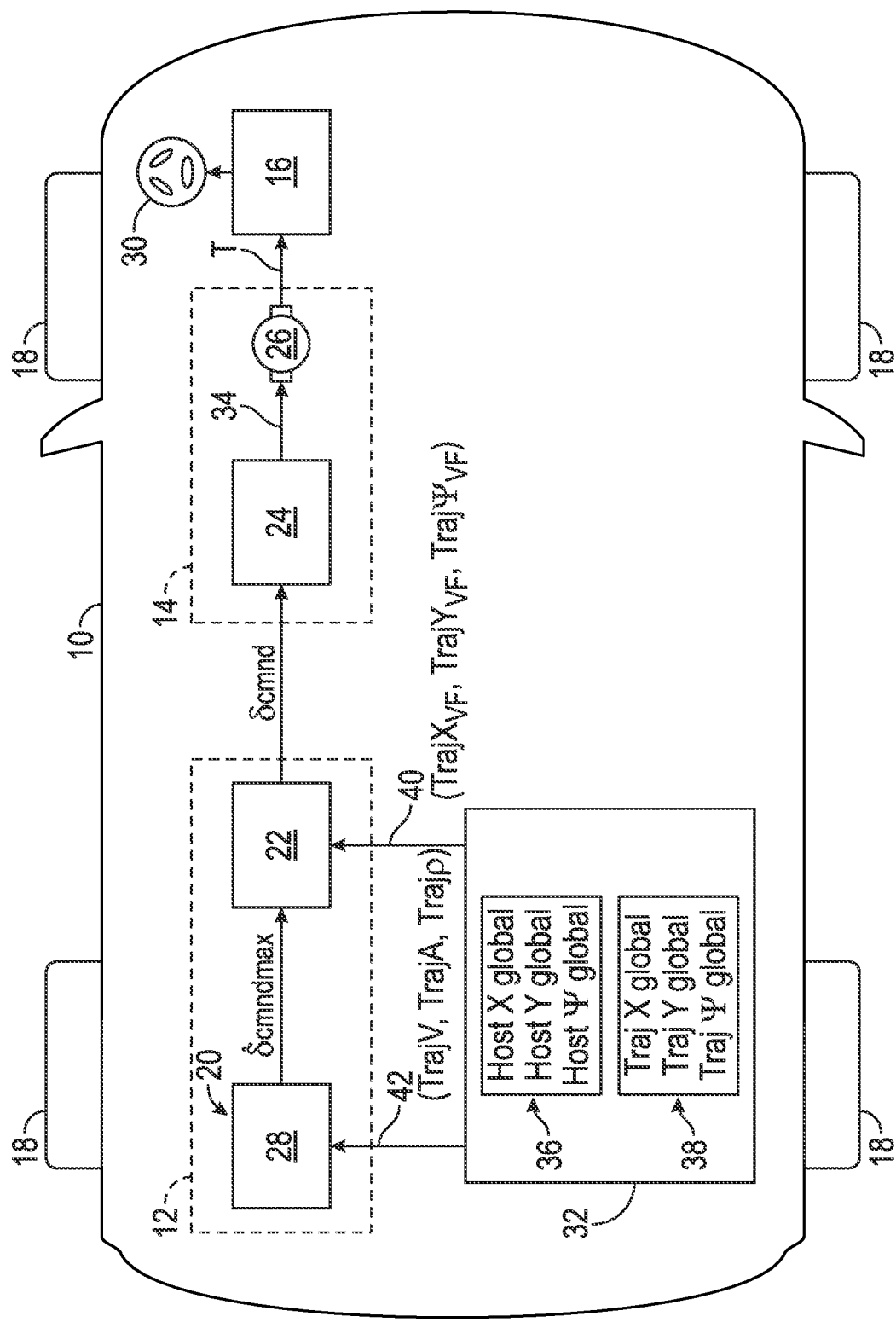
FIG. 1 is a schematic illustration of a vehicle including an autonomous driving and active safety (ADAS) system, an electric power steering (EPS) system, and a steering system that includes the disclosed limiting system, according to an exemplary embodiment.

Referring to FIG. 1, a schematic diagram illustrating an exemplary vehicle 10 is shown. The vehicle 10 is any type of motor vehicle such as, but not limited to, a passenger car such as a sedan, a truck, van, or a sport-utility vehicle. The vehicle 10 includes an autonomous driving and active safety (ADAS) system 12, an electric power steering (EPS) system 14, and a steering system 16 in electronic communication with one another. The ADAS system 12 includes a limiting system 20 in electronic communication with a trajectory tracking controller 22, and the EPS system 14 includes an EPS controller 24 in electronic communication with an electric motor 26, which provides an assist torque T to the steering system 16. The steering system 16 includes a hand wheel 30 and numerous gears, linkages, and other components for controlling a trajectory of the vehicle 10 by manipulating the wheels 18.

The disclosed limiting system 20 includes a controller 28 configured to determine a maximum rate of change of a commanded steering angle $\dot{\delta}_{cmndmax}$, which is sent to the trajectory tracking controller 22. The trajectory tracking controller 22 determines a commanded steering angle $\delta_{cmnd}$, which is sent to the EPS controller 24 of the EPS system 14. The EPS controller 24 determines a motor command 34 based on the commanded steering angle $\delta_{cmnd}$, which is sent to the electric motor 26. The electric motor 26 then generates the assist torque T provided to the steering system 16 based on the value of the motor command 34.

As explained below, the disclosed limiting system 20 constrains the commanded steering angle $\delta_{cmnd}$ sent to the EPS system 14 based on real-time data representing the current trajectory and velocity of the vehicle 10. Specifically, the limiting system 20 may reduce or prevent large variations or jumps in the value of the commanded steering angle $\delta_{cmnd}$. In particular, the limiting system 20 mitigates the impact of noisy or discontinuous localization inputs 36 that are provided to the trajectory tracking controller 22 to determine the commanded steering angle $\delta_{cmnd}$. It is to be appreciated that noisy or discontinuous localization data may create noisiness or jerking in the hand wheel 30 when the vehicle 10 operates in a semi-autonomous or hands-free driving mode, which some drivers may find objectionable.

In one non-limiting embodiment, the trajectory tracking controller 22 is a model predictive controller, however, other types of controllers may be used as well. The trajectory tracking controller 22 determines the commanded steering angle $\delta_{cmnd}$ based on the maximum rate of change of the commanded steering angle $\dot{\delta}_{cmndmax}$ and a plurality of trajectory variables 40, which are received from a trajectory generation system 32 of the vehicle 10 and are described below. As seen in FIG. 1, the trajectory generation system 32 also sends a plurality of trajectory planning inputs 42 to the controller 28 of the limiting system 20 as well.

Continuing to refer to FIG. 1, the trajectory variables 40 include a include a longitudinal component of a vehicle position TrajX$_{VF}$, a lateral component of a vehicle position TrajY$_{VF}$, and a trajectory heading of the vehicle Traj$\psi_{VF}$. The trajectory variables 40 are expressed in vehicle frame coordinates and are in array form. The trajectory variables 40 are determined by the trajectory generation system 32 based on the localization inputs 36 and position planning inputs 38. Specifically, the localization inputs 36 include an x-component of the current vehicle position HostX$_{global}$, a y-component of the current vehicle position HostY$_{global}$, and a current heading angle Host$\psi_{global}$. It is to be appreciated that the localization inputs 36 are expressed in the global frame as scalar values. The position planning inputs 38 include an x-component of the trajectory position of the vehicle TrajX$_{global}$, a y-component of the trajectory position of the vehicle TrajY$_{global}$, and a trajectory heading of the vehicle Traj$\psi_{global}$. The position planning inputs 38 are expressed in the global frame as an array. Finally, the trajectory planning inputs 42, which are sent to the controller 28, include a trajectory velocity of the vehicle TrajV, a trajectory acceleration of the vehicle TrajA, and a trajectory curvature of the vehicle Traj$\rho$. The trajectory planning inputs 42 are expressed in vehicle frame coordinates and are in array form.

The controller 28 of the limiting system 20 is in electronic communication with at least one other system in the vehicle 10 (i.e., the trajectory generation system 32 and the trajectory tracking controller 22). As explained below, the controller 28 determines the maximum rate of change of the commanded steering angle $\dot{\delta}_{cmndmax}$ based on the trajectory planning inputs 42 and a change in time $\Delta t$ (seen in FIG. 2). The controllers 22, 24, 28 shown in FIG. 1 may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers 22, 24, 28 may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

Figure 2:
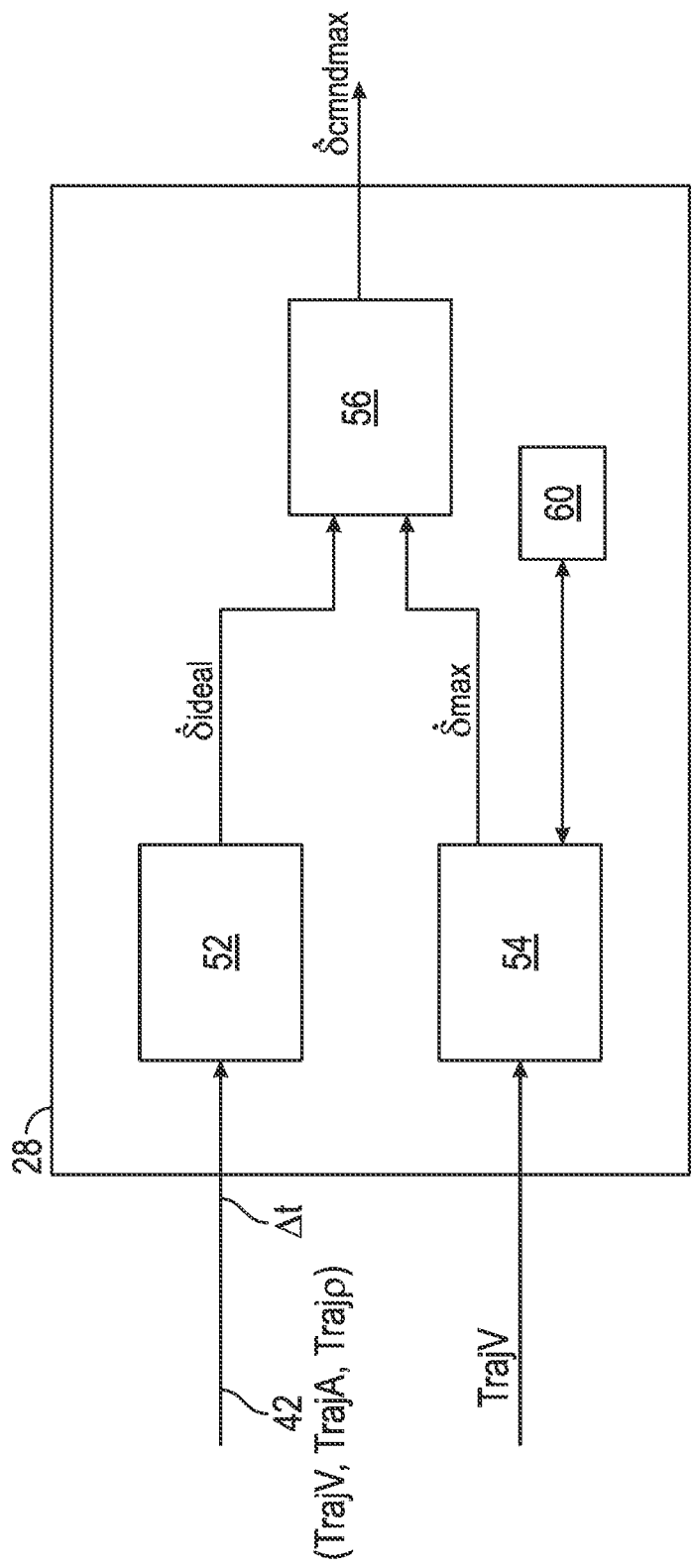
FIG. 2 is a block diagram of the limiting system shown in FIG. 1 according to an exemplary embodiment.

FIG. 2 is an illustration of the limiting system 20 shown in FIG. 1, where the controller 28 includes one or more modules 52, 54, and 56. Specifically, in the embodiment as shown in FIG. 2, the controller 28 includes a steering angle rate module 52, a maximum steering angle rate module 54, and an upper bound module 56, however, it is to be appreciated that the controller 28 may include different or other modules as well. As seen in FIG. 2, the steering angle rate module 52 receives the trajectory planning inputs 42 and the change in time $\Delta t$, where each trajectory planning input 42 is expressed in array form based on the change in time $\Delta t$. The steering angle rate module 52 determines an ideal rate of change of the commanded steering angle $\dot{\delta}_{ideal}$ based on the trajectory planning inputs 42 and the change in time $\Delta t$. The ideal rate of change of the commanded steering angle $\dot{\delta}_{ideal}$ assumes that the vehicle 10 perfectly follows the predefined trajectory and ideal parameter estimation. The ideal rate of change of the commanded steering angle $\dot{\delta}_{ideal}$ is also expressed in array form.

Figure 3B:
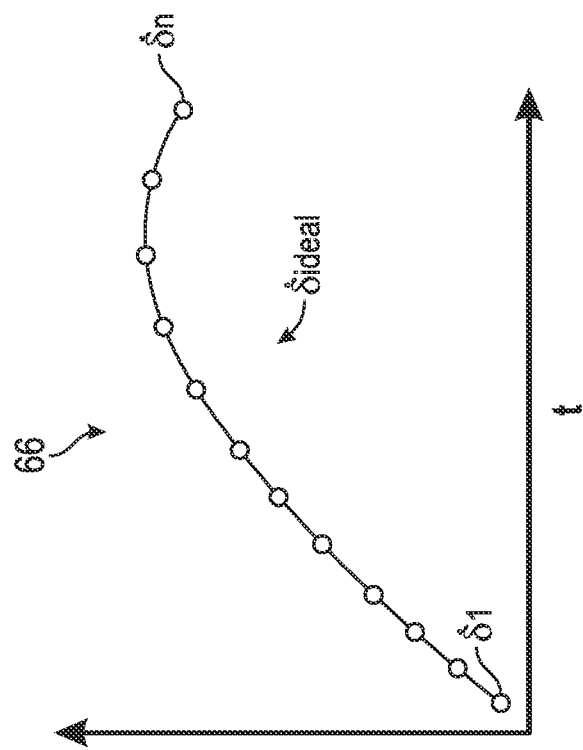
FIG. 3B illustrates a graph illustrating an exemplary ideal rate of change of the steering angle array according to an exemplary embodiment.
Figure 3A:
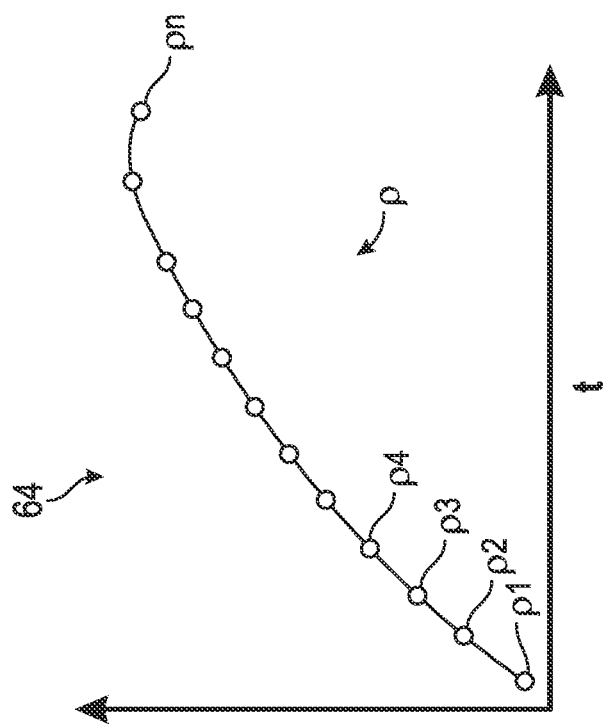
FIG. 3A illustrates a graph illustrating an exemplary trajectory curvature array according to an exemplary embodiment.

FIG. 3A is a graph illustrating an exemplary trajectory curvature array 64 representing the trajectory curvature of the vehicle Traj$\rho$, where time t is plotted along the x-axis and the trajectory curvature of the vehicle Traj$\rho$ is plotted along the y-axis. As seen in FIG. 3A, the trajectory curvature array 64 includes a plurality of curvature values $\rho$. In the example as shown in FIG. 3A, the array 64 includes twelve curvature values $\rho$ that each represent the trajectory curvature of the vehicle Traj$\rho$ at a unique point in time, where the spacing between the curvature values $\rho$ is the change in time $\Delta t$. Referring now to FIG. 3B, a graph illustrating an ideal rate of change of the commanded steering angle array 66 illustrating a corresponding ideal rate of change of the commanded steering angle $\dot{\delta}_{ideal}$ is shown.

Referring to FIGS. 2, 3A, and 3B, for each curvature value $\rho_n$ of the trajectory curvature array 64, steering angle rate module 52 determines a corresponding ideal rate of change of the commanded steering angle $\dot{\delta}_{ideal}$. Specifically, the steering angle rate module 52 determines the corresponding ideal rate of change of the commanded steering angle $\dot{\delta}_{ideal}$ based on Equations 1 and 2. First, the steering angle rate module 52 determines a rate of change of the trajectory curvature $\dot{\rho}$ based on a current value of the trajectory curvature $\rho_n$, a subsequent value of the trajectory curvature $\rho_{n+1}$, and the change in time $\Delta t$ between the current value of the trajectory curvature $\rho_n$ and the subsequent value of the trajectory curvature $\rho_{n+1}$, which is expressed in Equation 1 as:

$$\dot{\rho} = \frac{\rho_{n+1} - \rho_n}{\Delta t}$$

The steering angle rate module 52 then determines the corresponding ideal rate of change of the commanded steering angle $\dot{\delta}_{ideal}$ based on the rate of change of the trajectory curvature $\dot{\rho}$, a wheelbase L of the vehicle 10, a steering gradient LG of the vehicle 10, and a longitudinal velocity component $v_x$ of the vehicle 10. The wheelbase L and the steering gradient EG may be fixed values saved in a memory of the controller 28, and the longitudinal velocity $v_x$ is a longitudinal velocity component of a trajectory of the vehicle 10. Specifically, the corresponding ideal rate of change of the commanded steering angle $\dot{\delta}_{ideal}$ is determined based on Equation 2, which is expressed as:

$$\dot{\delta}_{ideal} = \dot{\rho}(L + EGv_x^2)$$

Referring back to FIG. 2, the maximum steering angle rate module 54 receives as input the trajectory velocity of the vehicle TrajV, where the trajectory velocity of the vehicle TrajV is expressed in array form as a trajectory velocity array, similar to the arrays 64 and 66 as shown in FIGS. 3a and 3B. The maximum steering angle rate module 54 determines a maximum rate of change $\dot{\delta}_{max}$ allowed by the EPS system 14 (seen in FIG. 1) for each trajectory velocity value that is part of the trajectory velocity array. Specifically, the controller 28 includes one or more look-up tables 60 saved in memory. The one or more look-up tables 60 provide the maximum rate of change $\dot{\delta}_{max}$ allowed for a specific trajectory velocity value by the EPS system 14. The maximum steering angle rate module 54 determines the maximum rate of change $\dot{\delta}_{max}$ allowed by the EPS system for each trajectory velocity value that is part of the trajectory velocity array by locating a corresponding value in the look-up tables 60.

Continuing to refer to FIG. 2, the upper bound module 56 determines the maximum rate of steering angle change $\dot{\delta}_{cmndmax}$ based on the corresponding ideal rate of change of the commanded steering angle $\dot{\delta}_{ideal}$, the maximum rate of change $\dot{\delta}_{max}$, and a calibration factor Y. The calibration factor is an empirically determined value stored in memory, and ranges in value from 0 to 1. The calibration factor Y scales the maximum rate of change $\dot{\delta}_{max}$. The upper bound module 56 determines the maximum rate of change of the commanded steering angle $\dot{\delta}_{cmndmax}$ by first adding the corresponding ideal rate of change of the commanded steering angle $\dot{\delta}_{ideal}$ with a product to determine a first value. The product is determined by multiplying the maximum rate of change $\dot{\delta}_{max}$ allowed by the EPS system 14 with the calibration factor Y. The upper bound module 56 then compares the first value with the maximum rate of change $\dot{\delta}_{max}$ allowed by the steering system 16. In response to determining the first value is less than or equal to the maximum rate of change $\dot{\delta}_{max}$ allowed by the EPS system 16, the upper bound module 56 sets the maximum rate of change of the commanded steering angle $\dot{\delta}_{cmndmax}$ to the first value. However, if the upper bound module 56 determines that the first value is greater than the maximum rate of change $\dot{\delta}_{max}$, the upper bound module 56 sets the maximum rate of change of the commanded steering angle $\dot{\delta}_{cmndmax}$ to the maximum rate of change $\dot{\delta}_{max}$ allowed by the EPS system 14. Referring back to FIG. 1, the controller 28 then sends the maximum rate of change of the commanded steering angle $\dot{\delta}_{cmndmax}$ to the trajectory tracking controller 22.

Figure 4:
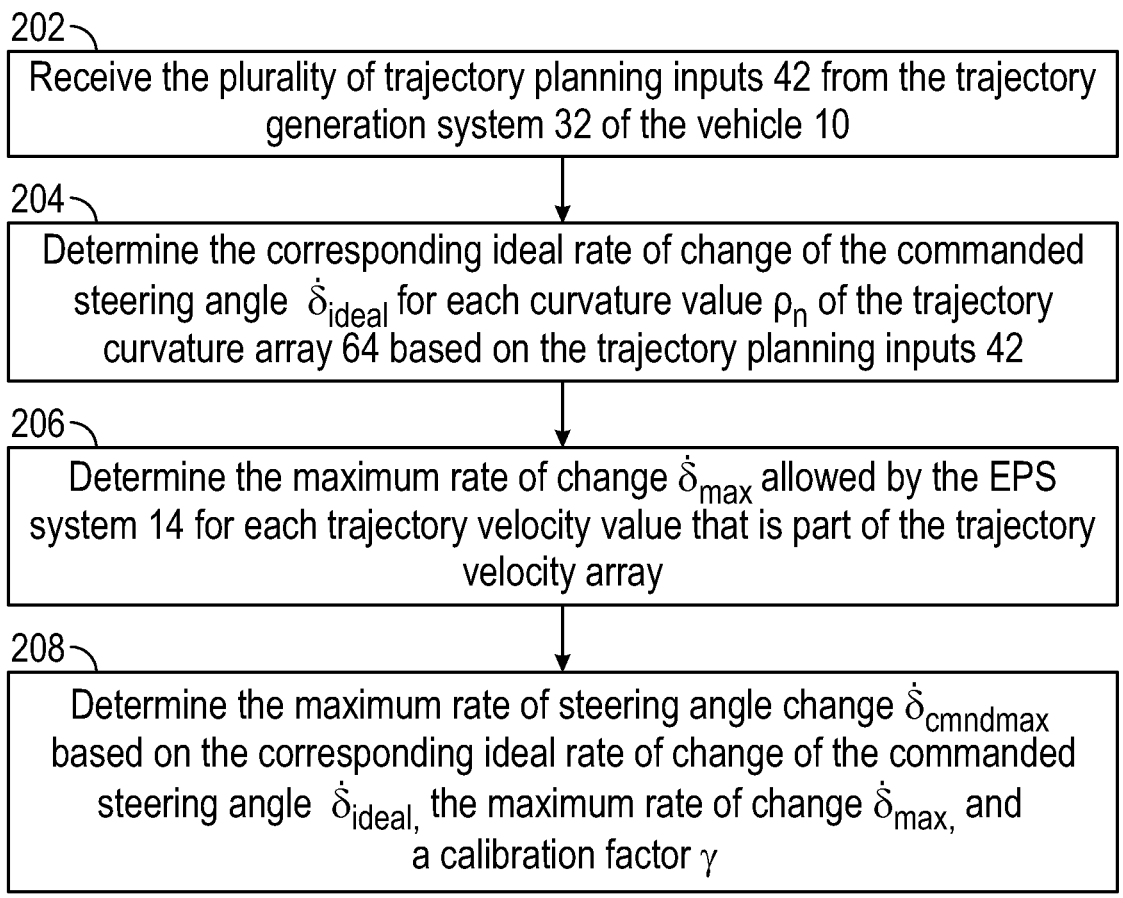
FIG. 4 is a process flow diagram illustrating a method for determining a commanded steering angle by the limiting system.

FIG. 4 is a process flow diagram illustrating an exemplary method 200 for determining the maximum rate of change of the commanded steering angle $\dot{\delta}_{cmndmax}$ by the limiting system 20 shown in FIG. 1. Referring now to FIGS. 1, 2, and 4, the method 200 may begin at block 202. In block 202, the controller 28 receives plurality of trajectory planning inputs 42 from the trajectory generation system 32 of the vehicle 10. As mentioned above, the trajectory planning inputs 42 are each expressed as an array including a plurality of values and include the trajectory velocity of the vehicle TrajV, the trajectory acceleration of the vehicle TrajA, and the trajectory curvature of the vehicle Trajρ. The method 200 may then proceed to block 204.

In block 204, the steering angle rate module 52 determines the corresponding ideal rate of change of the commanded steering angle $\dot{\delta}_{ideal}$ for each for each curvature value $\rho_n$ of the trajectory curvature array 64 based on the trajectory planning inputs 42. As explained above, Equation 1 is used to determine the rate of change of the trajectory curvature $\dot{\rho}$, and Equation 2 is used to determine the corresponding ideal rate of change of the commanded steering angle $\dot{\delta}_{ideal}$. The method 200 may then proceed to block 206.

In block 206, the maximum steering angle rate module 54 determines the maximum rate of change $\dot{\delta}_{max}$ allowed by the EPS system 14 for each trajectory velocity value that is part of the trajectory velocity array. Specifically, the maximum steering angle rate module 54 locates the corresponding maximum rate of change $\dot{\delta}_{max}$ allowed by the EPS system 14 in the one or more look-up tables based on a specific trajectory velocity value. The method 200 may then proceed to block 208.

In block 208, the upper bound module 56 determines the maximum rate of steering angle change $\dot{\delta}_{cmndmax}$ based on the corresponding ideal rate of change of the commanded steering angle $\dot{\delta}_{ideal}$, the maximum rate of change $\dot{\delta}_{max}$, and a calibration factory Y. Specifically, the upper bound module 56 determines the maximum rate of change of the commanded steering angle $\dot{\delta}_{cmndmax}$ by first adding the corresponding ideal rate of change of the commanded steering angle $\dot{\delta}_{ideal}$ with the product to determine a first value, wherein the product is determined by multiplying the maximum rate of change $\dot{\delta}_{max}$ allowed by the EPS system 14 with the calibration factor Y. The upper bound module 56 then compares the first value with the maximum rate of change $\dot{\delta}_{max}$ allowed by the steering system 16. In response to determining the first value is less than or equal to the maximum rate of change $\dot{\delta}_{max}$ allowed by the EPS system 16, the upper bound module 56 sets the maximum rate of change of the commanded steering angle $\dot{\delta}_{cmndmax}$ to the first value. However, if the upper bound module 56 determines that the first value is greater than the maximum rate of change $\dot{\delta}_{max}$, the upper bound module 56 sets the maximum rate of change of the commanded steering angle $\dot{\delta}_{cmndmax}$ to the maximum rate of change $\dot{\delta}_{max}$ allowed by the EPS system 14. As seen in FIG. 1, the maximum rate of change of the commanded steering angle $\dot{\delta}_{cmndmax}$ is then sent to the trajectory controller 22. The method 200 may then terminate.

Referring generally to the figures, the disclosed limiting system provides various technical effects and benefits to a vehicle. Specifically, current vehicle systems may employ a calibratable look-up table to determine a single value limit that is placed on the maximum rate of change of the commanded steering angle. However, if the localization inputs are noisy or discontinuous, this may cause noisy or jerking movements in the hand wheel. The present disclosure provides an approach for replacing the current calibratable look-up tables with a system and method to analytically determine, in real time, the input constraints for the commanded steering angle based on the current trajectory of the vehicle. Determining the commanded steering angle based on the current trajectory of the vehicle may reduce or substantially eliminate the unwanted movement in the hand wheel.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A limiting system constraining a commanded steering angle for a vehicle including an electric power steering (EPS) system, the limiting system comprising:
   a controller in electronic communication with at least one other system of the vehicle, wherein the controller executes instructions to:
     receive a plurality of trajectory planning inputs that are each expressed as an array including a plurality of values, wherein the plurality of trajectory planning inputs includes a trajectory velocity array, a trajectory acceleration array, and a trajectory curvature array;
     determine a corresponding ideal rate of change of the commanded steering angle for each curvature value that is part of the trajectory curvature array based on the trajectory planning inputs;
     determine a maximum rate of change allowed by the EPS system for each trajectory velocity value that is part of the trajectory velocity array; and
     determine a maximum rate of steering angle change based on the corresponding ideal rate of change of the commanded steering angle and the maximum rate change allowed by the EPS system, wherein the maximum rate of steering angle change limits the commanded steering angle.

2. The limiting system of claim 1, wherein the controller determines the corresponding ideal rate of change of the commanded steering angle for each curvature value that is part of the trajectory curvature array by executing instructions to:
   determine a rate of change of a trajectory curvature based on a current value of the trajectory curvature, a subsequent value of the trajectory curvature, and a change in time between a current value of the trajectory curvature and the subsequent value of the trajectory curvature.

3. The limiting system of claim 2, wherein the rate of change of the trajectory curvature is determined by:

$$\dot{\rho} = \frac{\rho_{n+1} - \rho_n}{\Delta t}$$

wherein $\dot{\rho}$ represents the rate of change of the trajectory curvature, $\rho_n$ represents a current value of the trajectory curvature, $\rho_{n+1}$ represents the subsequent value of the trajectory curvature, and $\Delta t$ represents the change in time between the current value of the trajectory curvature $\rho_n$ and the subsequent value of the trajectory curvature.

4. The limiting system of claim 2, wherein the controller determines the corresponding ideal rate of change of the commanded steering angle for each curvature value that is part of the trajectory curvature array by executing instructions to:
   determine the corresponding ideal rate of change of the commanded steering angle based on the rate of change of the trajectory curvature, a wheelbase of the vehicle, a steering gradient of the vehicle, and a longitudinal velocity component of the vehicle.

5. The limiting system of claim 4, wherein the corresponding ideal rate of change of the commanded steering angle is determined by:

$$\dot{\delta}_{ideal} = \dot{\rho}(L + EGv_x^2)$$

wherein $\dot{\delta}_{ideal}$ is corresponding ideal rate of change of the commanded steering angle, $\dot{\rho}$ is the rate of change of the trajectory curvature, L is a wheelbase of the vehicle, EG is a steering gradient of the vehicle, and $v_x$ is a longitudinal velocity component of a trajectory of the vehicle.

6. The limiting system of claim 1, wherein the controller includes one or more look-up tables saved in memory, and wherein the one or more look-up tables provide the maximum rate of change allowed for a specific trajectory velocity value.

7. The limiting system of claim 6, wherein the controller determines the maximum rate of change allowed by the EPS system by executing instructions to:
   locate a corresponding maximum rate of change value in the one or more look-up tables based on a specific trajectory velocity value.

8. The limiting system of claim 1, wherein the controller determines the maximum rate of steering angle change based on a calibration factor.

9. The limiting system of claim 8, wherein the calibration factor ranges in value from 0 to 1.

10. The limiting system of claim 8, wherein the controller determines the maximum rate of change of the commanded steering angle by executing instructions to:
    add the corresponding ideal rate of change of the commanded steering angle with a product to determine a first value, wherein the product is determined by multiplying the maximum rate of change with the calibration factor.

11. The limiting system of claim 10, wherein the controller determines the maximum rate of change of the commanded steering angle by executing instructions to:
    compare the first value with the maximum rate of change; and
    in response to determining the first value is less than or equal to the maximum rate of change, set the maximum rate of change of the commanded steering angle to the first value.

12. The limiting system of claim 10, wherein the controller determines the maximum rate of change of the commanded steering angle by executing instructions to:
    compare the first value with the maximum rate of change; and
    in response to determining the first value is greater than the maximum rate of change, set the maximum rate of change of the commanded steering angle to the maximum rate of change allowed by the EPS system.

13. An autonomous driving and active safety (ADAS) system for a vehicle including an EPS system, the ADAS system comprising:
a trajectory tracking controller that determines a commanded steering angle, wherein the trajectory tracking controller is in electronic communication with the EPS system; and
a limiting system including a controller in electronic communication with the trajectory tracking controller, wherein the controller executes instructions to:
receive a plurality of trajectory planning inputs that are each expressed as an array including a plurality of values, wherein the plurality of trajectory planning inputs includes a trajectory velocity array, a trajectory acceleration array, and a trajectory curvature array;
determine a corresponding ideal rate of change of the commanded steering angle for each curvature value that is part of the trajectory curvature array based on the trajectory planning inputs;
determine a maximum rate of change allowed by the EPS system for each trajectory velocity value that is part of the trajectory velocity array; and
determine a maximum rate of steering angle change based on the corresponding ideal rate of change of the commanded steering angle and the maximum rate change allowed by the EPS system, wherein the maximum rate of steering angle change limits the commanded steering angle.

14. The ADAS of claim 13, wherein the trajectory tracking controller determines the commanded steering angle based on the maximum rate of steering angle change.

15. The ADAS of claim 13, wherein the controller determines the corresponding ideal rate of change of the commanded steering angle for each curvature value that is part of the trajectory curvature array by executing instructions to:
determine a rate of change of a trajectory curvature based on a current value of the trajectory curvature, a subsequent value of the trajectory curvature, and a change in time between a current value of the trajectory curvature and the subsequent value of the trajectory curvature.

16. The ADAS of claim 15, wherein the rate of change of the trajectory curvature is determined by:

$$\dot{\rho} = \frac{\rho_{n+1} - \rho_n}{\Delta t}$$

wherein $\dot{\rho}$ represents the rate of change of the trajectory curvature, $\rho_n$ represents a current value of the trajectory curvature, $\rho_{n+1}$ represents the subsequent value of the trajectory curvature, and $\Delta t$ represents the change in time between the current value of the trajectory curvature $\rho_n$ and the subsequent value of the trajectory curvature.

17. The ADAS of claim 15, wherein the controller determines the corresponding ideal rate of change of the commanded steering angle for each curvature value that is part of the trajectory curvature array by executing instructions to:
determine the corresponding ideal rate of change of the commanded steering angle based on the rate of change of the trajectory curvature, a wheelbase of the vehicle, a steering gradient of the vehicle, and a longitudinal velocity component of the vehicle.

18. The ADAS of claim 17, wherein the corresponding ideal rate of change of the commanded steering angle is determined by:

$$\dot{\delta}_{ideal} = \dot{\rho}(L + EGv_x^2)$$

wherein $\dot{\delta}_{ideal}$ is corresponding ideal rate of change of the commanded steering angle, $\dot{\rho}$ is the rate of change of the trajectory curvature, L is a wheelbase of the vehicle, EG is a steering gradient of the vehicle, and $v_x$ is a longitudinal velocity component of a trajectory of the vehicle.

19. The ADAS of claim 13, wherein the controller determines the maximum rate of steering angle change based on a calibration factor.

20. A method for constraining a commanded steering angle for a vehicle including an electric power steering (EPS) system, the method comprising:
receiving, by a controller, a plurality of trajectory planning inputs that are each expressed as an array including a plurality of values, wherein the plurality of trajectory planning inputs includes a trajectory velocity array, a trajectory acceleration array, and a trajectory curvature array;
determining a corresponding ideal rate of change of the commanded steering angle for each curvature value that is part of the trajectory curvature array based on the trajectory planning inputs;
determining a maximum rate of change allowed by the EPS system for each trajectory velocity value that is part of the trajectory velocity array; and
determining a maximum rate of steering angle change based on the corresponding ideal rate of change of the commanded steering angle and the maximum rate change allowed by the EPS system, wherein the maximum rate of steering angle change limits the commanded steering angle.

* * * * *